US010783515B2

United States Patent
Olawale et al.

(10) Patent No.: US 10,783,515 B2
(45) Date of Patent: Sep. 22, 2020

(54) METHOD AND SYSTEM FOR CONDUCTING WIRELESS ELECTRONIC CREDIT CARD TRANSACTIONS

(71) Applicant: IroFit Technologies Oy, Kuopio (FI)

(72) Inventors: Abimbola Omoniyi Olawale, Kuopio (FI); Abosede Olusola Folorunso, Kuopio (FI); Olusegun Emmanuel Okedara, Kuopio (FI)

(73) Assignee: IroFit Technologies Oy, Kuopio (FI)

( * ) Notice: Subject to any disclaimer, the term of this patent is extended or adjusted under 35 U.S.C. 154(b) by 702 days.

(21) Appl. No.: 14/718,142

(22) Filed: May 21, 2015

(65) Prior Publication Data

US 2015/0371216 A1     Dec. 24, 2015

Related U.S. Application Data

(60) Provisional application No. 62/014,366, filed on Jun. 19, 2014.

(51) Int. Cl.
*G06Q 20/34*     (2012.01)
*G06Q 20/32*     (2012.01)

(52) U.S. Cl.
CPC ......... *G06Q 20/34* (2013.01); *G06Q 20/3255* (2013.01)

(58) Field of Classification Search
CPC .... G06Q 20/06; G06Q 20/12; G06Q 20/3223; G06Q 20/3255; G06Q 20/34;

(Continued)

(56) References Cited

U.S. PATENT DOCUMENTS 5,719,918 A * 2/1998 Serbetciouglu ........ G06Q 20/04
    379/93.12
6,415,156 B1 * 7/2002 Stadelmann ........... G06Q 20/02
    455/403

(Continued)

FOREIGN PATENT DOCUMENTS

EP     1178450     2/2002
EP     1178450 A2 * 2/2002 ............. G06Q 20/04

(Continued)

OTHER PUBLICATIONS

Author: "Johan Hellström", Title: "The Innovative Use of Mobile Applications in East Africa", Date of final report: May 2010, Published by: Edita 2010, ISBN: 978-91-586-4129-7, pp. 28-35 (Year: 2010) (Year: 2010).*

(Continued)

*Primary Examiner* — Kito R Robinson
*Assistant Examiner* — Tony P Kanaan
(74) *Attorney, Agent, or Firm* — Nixon & Vanderhye

(57) ABSTRACT

A method and system for providing electronic wireless credit card transactions to small businesses in conditions where the wireless telecommunications network is old and/or underdeveloped. The system allows a merchant to accept payment cards firstly via TCP/IP and secondly via SMS and/or USSD wherever only the most basic GSM network is available. The merchant does not need dedicated wireless terminals to do that. With the smartphone app and the peripheral card reader using the novel method, a merchant in the middle of a remote African village or Siberia can accept a payment cards on the spot, right there and then, if basic GSM network is available, but can also use the same devices in e.g. central London with 4G networks. A corresponding software product is also described.

18 Claims, 4 Drawing Sheets

(58) Field of Classification Search
CPC .............. G06Q 20/387; G06Q 20/405; G06Q 30/0207; G06Q 30/0222; G06Q 30/0226; G06Q 30/0227; G06Q 30/0236; G06Q 30/0239
See application file for complete search history.

(56) References Cited

U.S. PATENT DOCUMENTS

| | | | | |
|---|---|---|---|---|
| 8,019,365 | B2* | 9/2011 | Fisher | G06Q 20/327 455/466 |
| 8,667,057 | B1* | 3/2014 | Adya | H04L 63/0807 709/203 |
| 8,983,873 | B2* | 3/2015 | Lund | G06Q 20/20 235/380 |
| 9,230,254 | B1* | 1/2016 | Sharifi Mehr | G06Q 20/3567 |
| 10,037,521 | B1* | 7/2018 | Botros | G06Q 20/16 |
| 10,275,758 | B2* | 4/2019 | Lund | G06Q 20/20 |
| 2006/0231623 | A1* | 10/2006 | Brown | G06K 7/0008 235/451 |
| 2007/0255652 | A1* | 11/2007 | Tumminaro | G06Q 30/06 705/39 |
| 2008/0147550 | A1* | 6/2008 | Morsillo | G06Q 20/20 705/44 |
| 2010/0094756 | A1* | 4/2010 | Humphrey | G06Q 20/02 705/44 |
| 2011/0086616 | A1* | 4/2011 | Brand | G06Q 20/10 455/411 |
| 2011/0125566 | A1* | 5/2011 | McLaughlin | G06Q 20/20 705/14.23 |
| 2011/0158252 | A1* | 6/2011 | Birdsall | H04L 51/16 370/417 |
| 2012/0078789 | A1* | 3/2012 | Harrell | G06Q 20/12 705/44 |
| 2013/0144792 | A1* | 6/2013 | Nilsson | G06Q 20/32 705/67 |
| 2013/0200149 | A1 | 8/2013 | Dorsey et al. | |
| 2013/0311382 | A1* | 11/2013 | Fosmark | G06Q 20/425 705/71 |
| 2014/0006205 | A1 | 1/2014 | Berry et al. | |
| 2014/0164154 | A1 | 6/2014 | Ramaci | |
| 2015/0142654 | A1* | 5/2015 | Zamer | G06Q 20/36 705/44 |
| 2016/0110716 | A1* | 4/2016 | Sharifi Mehr | G06Q 20/3567 705/75 |
| 2017/0249627 | A1* | 8/2017 | Smythe | G06Q 20/3255 |

FOREIGN PATENT DOCUMENTS

| | | | | |
|---|---|---|---|---|
| EP | 1178450 | A2 * | 2/2002 | ............ G06Q 20/04 |
| KR | 2001-0095371 | A | 11/2001 | |

OTHER PUBLICATIONS

International search report, dated Sep. 8, 2015; Application No. PCT/FI2015/050365.

* cited by examiner

METHOD AND SYSTEM FOR CONDUCTING WIRELESS ELECTRONIC CREDIT CARD TRANSACTIONS

TECHNICAL FIELD OF INVENTION

The invention relates to the field of electronic payment card transactions. More particularly, the invention relates to providing electronic wireless credit card transactions to small businesses in conditions where the wireless telecommunications network is old and/or underdeveloped.

BACKGROUND

Almost every adult person on the planet needs a credit card, and almost every business on the planet needs to be able to accept them. Due to this fundamental need, there is a diverse array of technologies that cater for the need to conduct these electronic transactions. The most common method involves the use of dedicated wireless credit card terminals that are connected either to a payment network, like VISA or MASTERCARD, or to an card issuing bank.

The dedicated payment network infrastructure and devices are expensive, however, and therefore cheaper mobile phone accessory based technologies have been brought to the market. In these technologies there is a smartphone 3rd party application, aka. an "app", and an accessory payment card reader.

FIG. 1 shows a known prior art method. In this method, the payment amount is entered on the mobile payment app with the user interface of the phone. The transaction amount and other transaction details are transmitted to the card reader via Bluetooth/WiFi. A card (Chip and PIN, magnetic stripe, or NFC) is inserted/swiped/tapped on the card reader that reads the card information. The card reader encrypts all the transaction details including card details, transaction amount and transaction ID, and transmits a single payload (P) to the mobile app via Bluetooth/WiFi. Payload P is about 2,000 characters long. The app sends this data payload to a back-end server via Internet.

From the back-end server, transaction details are sent via standard secure protocols (secure socket layer (SSL)) to the issuing bank/payment processor to get authorization for the payment. If everything is ok with the transaction (card is valid and the funds are available), the back-end server gets an 'authorization ok' message from the issuing bank/payment processor. The back-end server then sends a message to the mobile app confirming authorization. A 'capture' message is sent to the issuing bank to withhold the funds, and then a 'transaction accepted' message is sent back to the app, and is displayed for users to know the transaction has been completed.

KR2001095371A discloses a method for communicating previously stored payment card details via GSM SMS (Short Message Service). This document is cited here as reference.

The prior art has notable disadvantages in emerging economies, e.g. Africa, in that a wireless Internet connection is not readily available in all locations for smartphones. Further, the prior art techniques using SMS for payment card data communication are unsuited to ad-hoc payment card transactions.

SUMMARY

The invention under study is directed towards a system and a method for effectively providing ad-hoc payment card transactions via a smartphone app in a mix of network conditions that is typical to an emerging economy, e.g. Africa.

A further object of the invention is to present a system and a method where the card reader is connected to the smartphone app via Bluetooth, and the smartphone app sends the payment data payload (P) via Internet as a first choice, and if an internet connection is not available, or the bandwidth is insufficient uses SMS and/or USSD as a second choice.

In one aspect of the invention the payment data payload is of the standard size, and therefore a plurality of SMS (Short Message Service) and/or USSD (Unstructured Supplementary Services Data) messages are sent each containing an identifying header. The back end server assembles the payment data payload from the plurality of received SMS and/or USSD messages. Then the payment is processed in the usual way. This system and method accrues a number of advantages solving the problems of the prior art.

An electronic payment system is in accordance with the invention and comprises a mobile station, a payment card reader, a communication network and a payment processing server, wherein,
  the payment card reader is arranged to be connected into a data port of the mobile station,
  the mobile station is arranged to comprise a third party application controlling said payment card reader,
  said payment card reader is arranged to read payment details from a payment card,
  said third party application is arranged to read and/or receive payment details from the payment card reader and transmit said payment details via a wireless Internet connection if said connection is available as a first choice, or via a plurality of SMS and/or USSD messages as a second choice if said wireless Internet connection is unavailable.

An electronic payment method is in accordance with the invention and includes a mobile station, a payment card reader, a communication network and a payment processing server, wherein,
  the payment card reader connects into a data port of the mobile station,
  the mobile station comprises a third party application controlling said payment card reader,
  said payment card reader reads payment details from a payment card,
  said third party application reads and/or receives payment details from the payment card reader and transmits said payment details via a wireless Internet connection if said connection is available as a first choice, or via a plurality of SMS and/or USSD messages as a second choice if said wireless Internet connection is unavailable.

A software program product stored in at least one data storage device is in accordance with the invention, said software program facilitating electronic payments in a system comprising a mobile station, a payment card reader, a communication network and a payment processing server, wherein,
  the payment card reader software is arranged to be connected into a data port of the mobile station,
  the mobile station is arranged to comprise a third party software application controlling said payment card reader software,
  said payment card reader software is arranged to read payment details from a payment card,
  said third party software application is arranged to read and/or receive payment details from the payment card reader software and transmit said payment details via a wireless Internet connection if said connection is available as a first choice, or via a plurality of SMS and/or USSD messages as a second choice if said wireless Internet connection is unavailable.

The inventive system allows a merchant to accept payment cards wherever only the most basic GSM network is available. The merchant does not need a dedicated Point of Sale terminal to do that. With the smartphone app and the peripheral card reader using the inventive method, a merchant in the middle of a remote location in Africa or Siberia can accept payment cards on the spot, right there and then, if basic GSM network is available, but can also use the same devices in e.g. central London with 4G networks. A further advantage is that the inventive system works with the card reader encryption, providing the same data security as traditional dedicated Point of Sale card terminals.

In addition and with reference to the aforementioned advantage accruing embodiments, the best mode of the invention is considered to be a smartphone 3rd party application and a card reader connected thereto, where payment data is transmitted through the wireless Internet connection as the first choice and as a second choice the payment data is transmitted via a plurality of text messages to a payment processing server via the radio devices of the mobile phone controlled by the 3rd party app.

BRIEF DESCRIPTION OF THE DRAWINGS

In the following the invention will be described in greater detail with reference to exemplary embodiments in accordance with the accompanying drawings, in which FIG. 1 demonstrates an embodiment of the prior art.

Some of the embodiments are described in the dependent claims.

DETAILED DESCRIPTION OF EMBODIMENTS

Figure 1:
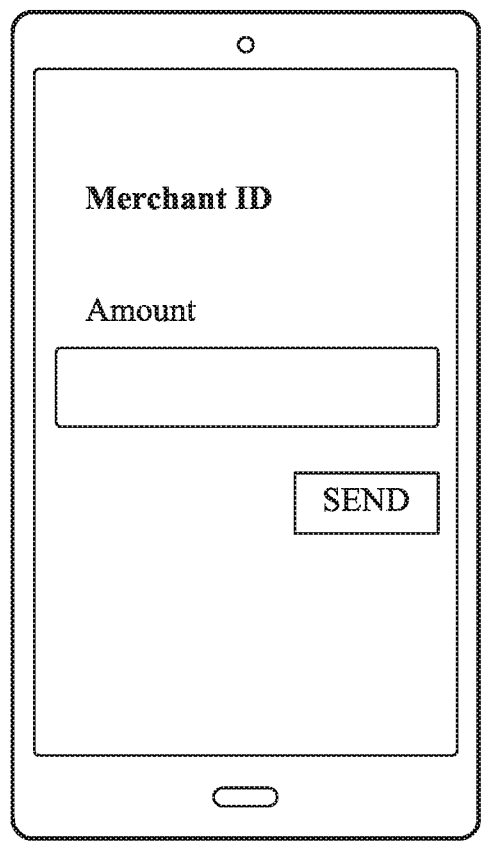
Figure 2:
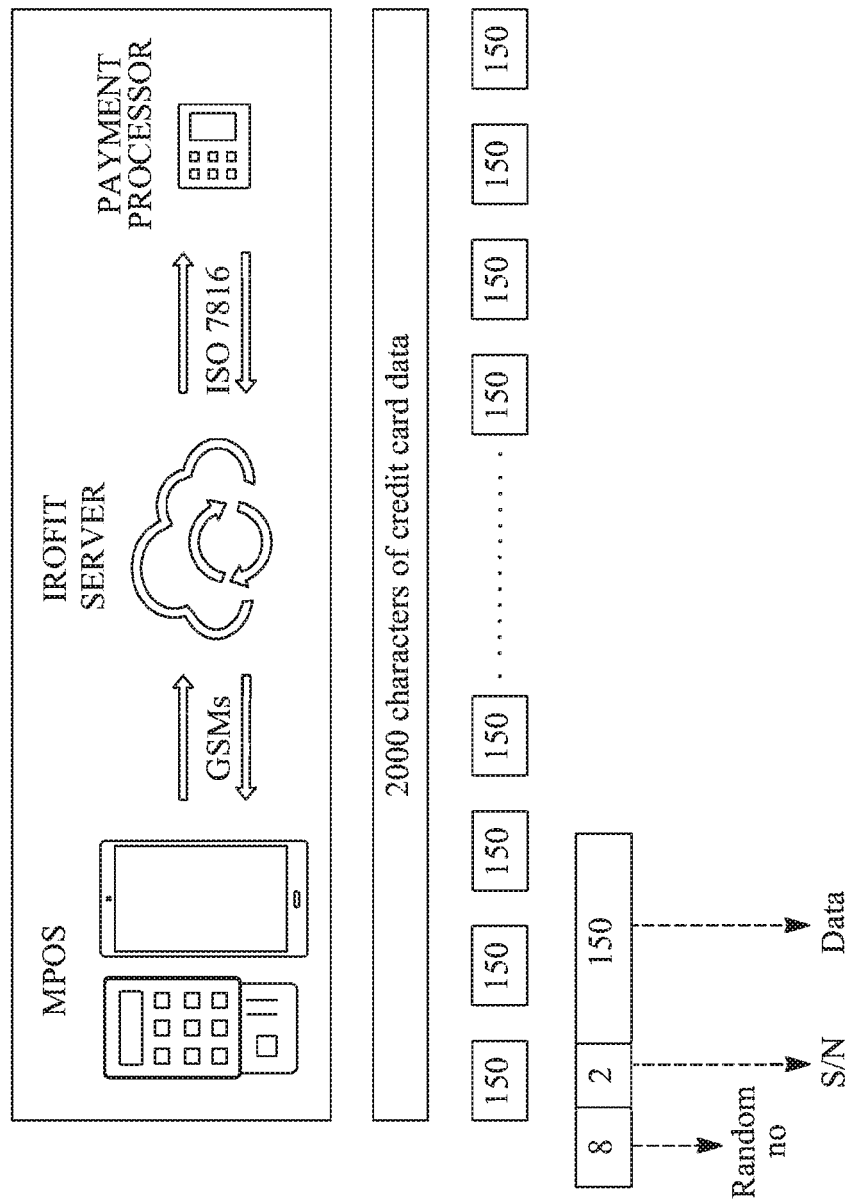
FIG. 2 demonstrates an embodiment 20 of the electronic credit card transaction system in accordance with the invention as a block diagram.

In FIG. 2 the smartphone and the card reader form a mobile Point Of Sale (mPOS), as shown. The smartphone is any smartphone, such as iPhone, Android, Sailfish, and/or Windows phone capable of running mobile third party software applications, known as "apps". The Card reader is connected to mobile station via audio port, Bluetooth wireless, data port, NFC, IrdA, Wifi or any other wireless or wireline communication channel. In some embodiments the mobile phone is replaced by a tablet, e.g. an iPad, Kindle or a similar mobile computer that does not have a conventional phone feature.

Figure 4:
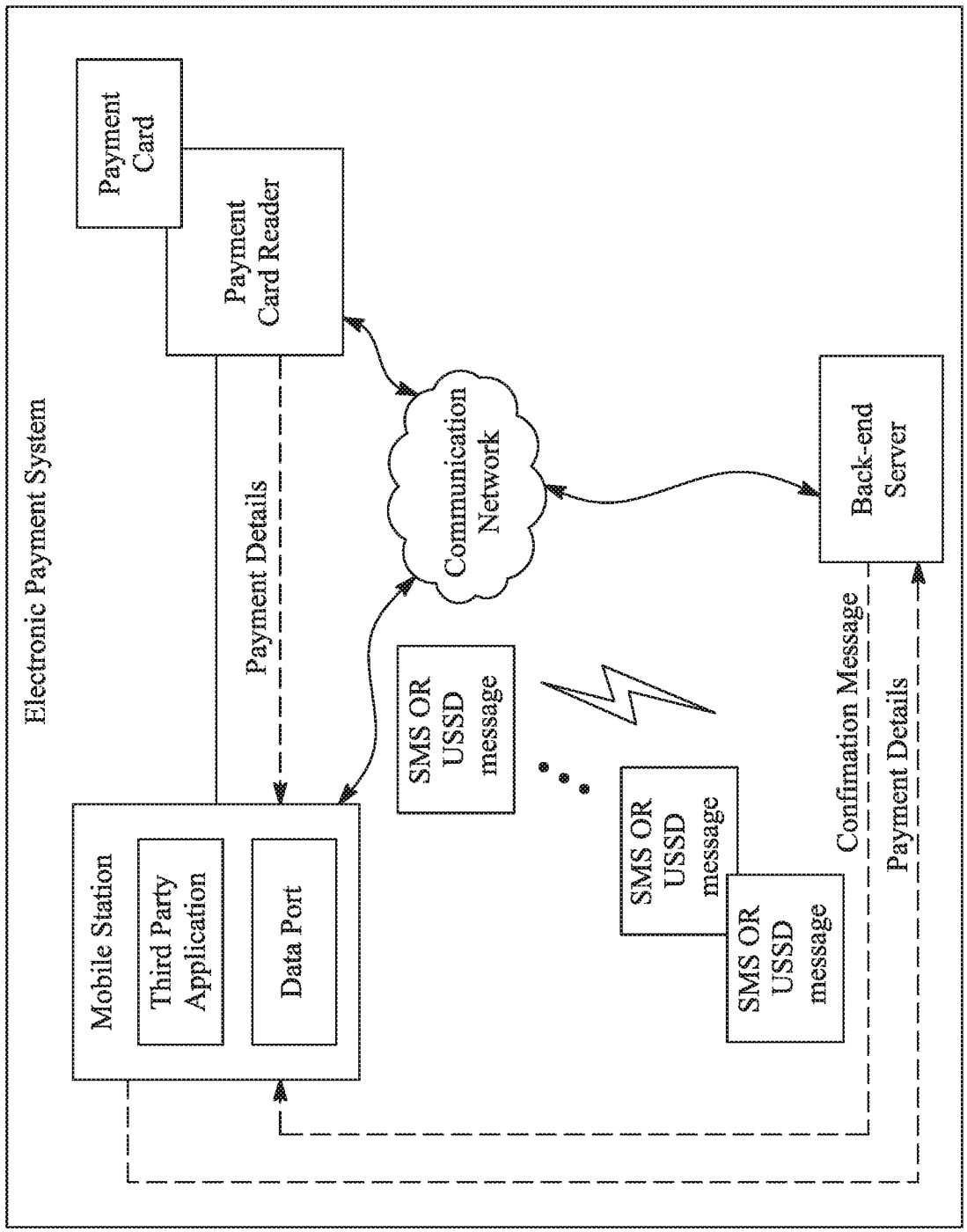
FIG. 4 demonstrates a schematic diagram of one or more embodiments of the invention.

The smartphone app has an intelligent switch that determines if the Internet connection is available to transmit the transaction payment card details via the traditional Internet-based route. If the Internet connection is of good quality and/or bandwidth, payment card details are transmitted via TCP/IP protocols to at least one back-end server, as shown in FIG. 4. Also other communication protocols may be used in accordance with the invention.

If, the Internet connection does not have sufficient bandwidth or availability, the payment card data payload is automatically routed through SMS/USSD, as shown in FIG. 4. The mobile smartphone app splits the data payload into a fixed number of segments, for example to 14 segments/messages such that each segment contains about 150 characters. Each of these segments (P1 . . . n) is tagged with a unique serial identification number.

Then, in accordance with some embodiments of the invention, it is required that each SMS message segment contains the serial number of the message, and how many messages are in that data payload batch, e.g. (1/14), (2/14) and so on. A random tag is also inserted, which helps the mobile smartphone app validate any confirmatory message as truly coming from the back end server, and not from some other possibly malicious source.

Figure 3:
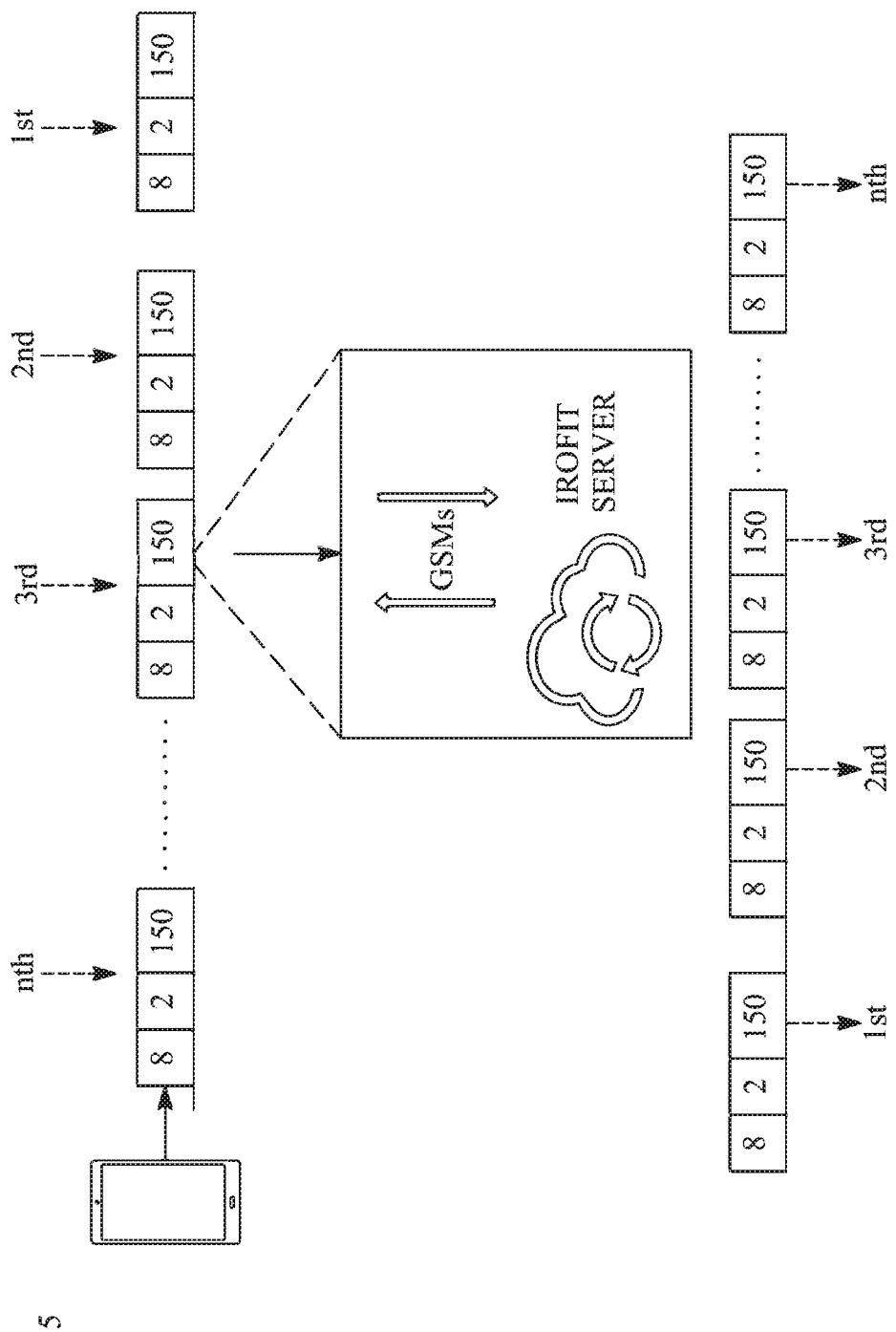
FIG. 3 demonstrates an embodiment 30 of the electronic credit card transaction method in accordance with the invention as a schematic flow diagram.

Thus, each message has a unique serial identification number where, for instance, the first 8, characters are random, and last 2 characters are serial numbers as shown in the embodiment of FIG. 3. The actual 150 character transaction information may be in any part of the SMS and/or USSD message, preferably at the end of the message, as also is shown in FIG. 3. This gives a total of 160 characters per message sent from the mobile smartphone app to the back end server.

The back end server checks to be sure that all segments are complete. If any segment(s) is/are not delivered to the back end server, the back end server sends a message back to the smartphone app, indicating the particular missing segments so that the smartphone app can send those segments again, until the whole data payload is completely received at the back end server. A confirmatory message from the back end server then indicates to the smartphone app that all SMS and/or USSD segments/messages are delivered, and there is no more a need to send them in some embodiments.

In some embodiments, if the app does not receive any message from the back end server within a specified time (T1), the app sends the whole batch of messages again at specified intervals until there is an acknowledgement message from the back end server.

In some embodiments if the process is not completed by the end of a specified amount of time (T2) [T2>T1], the whole transaction is terminated, and must be started all over again. Exemplary times in some embodiments are T1=10s and T2=30s, but other values are also possible in accordance with the invention.

At the back end server, the segments are identified with the serial identification number, which was tagged on them at the mobile smartphone app. The segments of payment data payload are then recombined at the back end server. The recombination forms a single, still encrypted, data payload P identical to the original payload transmitted from the card reader that read the payment card.

It is worth special attention that at NO point during the whole aforementioned inventive method or system (i.e. transmission, splitting, tagging, recombination . . . ) is the original encryption of the card reader broken or decrypted in any way. This ensures that point to point encryption is preserved. This means that while the smartphone is used as a medium for payment card data communication, the data security is the same as in using the conventional far more expensive dedicated Point of Sale card terminal solution.

The invention has been explained above with reference to the aforementioned embodiments and several commercial and industrial advantages have been demonstrated. The methods and arrangements of the invention allow the use of economically affordable ad hoc/instant payment card transactions via the means of a card reader accessory and a mobile smartphone app in almost any cellular network that supports the basic SMS and/or USSD. In addition to cheaper cost, data security is maintained at the same level as in more expensive prior art systems.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

KR2001095371A, HONG SEONG PYO, SAMSUNG ELECTRONICS CO LTD, 2001

The invention claimed is:

1. An electronic payment system comprising:
a mobile station;
a payment card reader capable of connecting into a data port of the mobile station, said payment card reader reading payment details from a payment card;
a communication network; and
a back-end server,
wherein the mobile station comprises a third party application controlling the payment card reader, said third party application being configured to read and receive the payment details from the payment card reader when the payment card reader is connected to the mobile station and transmit said payment details to the back-end server via a wireless Internet connection when said connection is available as a first choice, and via a plurality of Short Message Service (SMS) or Unstructured Supplementary Services Data (USSD) messages as a second choice when said wireless Internet connection is unavailable,
the payment details are split into a plurality of data payload parts of a data payload, and each said SMS or USSD message comprises one of the data payload parts and a serial identification number, identifying the data payload,
said SMS or USSD messages are sent to the back-end server that recombines all of the plurality of data payload parts in all of the plurality of SMS or USSD messages into all of the payment details,
the back-end server sends a confirmatory message back to said mobile third party application upon having received all of the SMS and USSD messages or all of the payment details, and
the mobile third party application comprises a time limit T1, within which when the confirmatory message is not received at the mobile third party application, said mobile third party application sends the SMS and USSD messages comprising the payment details again to the back-end server.

2. The electronic payment system as claimed in claim 1, wherein the back-end server is configured to check the integrity of the payment details and the plurality of messages, and when a message is missing or has a defect, the back-end server sends a check-up message back to the mobile third party application that sent the messages and requests the resending of the missing or defective messages.

3. The electronic payment system as claimed in claim 1, wherein payment data is encrypted by the card reader.

4. The electronic payment system as claimed in claim 1, wherein the card reader is configured to be connected to the mobile station via audio line-in, Bluetooth™, USB, data port, NFC, IrdA™, Wifi™ or any other wireless or wireline communication path.

5. The electronic payment system as claimed in claim 1, wherein the payment details are data representing a payment transaction.

6. The electronic payment system as claimed in claim 1, wherein the payment details comprise payment sum and currency.

7. An electronic payment method, comprising:
connecting a payment card reader, into a data port of a mobile station, the mobile station comprising a third party application controlling said payment card reader;
reading, by said payment card reader, payment details from a payment card;
one or more of reading and receiving, by said third party application, the payment details from the payment card reader and transmitting said payment details to the back-end server via a wireless Internet connection when said connection is available as a first choice, and via a plurality of Short Message Service (SMS) or Unstructured Supplementary Services Data (USSD) messages as a second choice when said wireless Internet connection is unavailable,
wherein the payment details are split into a plurality of data payload parts of a data payload, and each said SMS or USSD message comprises one of the data payload parts and a serial identification number, identifying the data payload,
said SMS or USSD messages are sent to the back-end server that recombines all of the plurality of data payload parts in all of the plurality of SMS or USSD messages into all of the payment details, and
the back-end server sends a confirmatory message back to said mobile third party application upon having received all of the SMS and USSD messages or all of the payment details, and the mobile third party application comprises a time limit T1, within which when the confirmatory message is not received at the mobile third party application, said mobile third party application sends the SMS and USSD messages comprising the payment details again to the back-end server.

8. The electronic payment method as claimed in claim 7, wherein the back-end server checks the integrity of the payment details or the plurality of messages, and when a message is missing or has a defect, the back end server sends a check-up message back to the mobile third party application that sent the messages and requests the resending of the missing or defective messages.

9. The electronic payment method as claimed in claim 7, wherein payment data is encrypted by the card reader.

10. The electronic payment method as claimed in claim 7, wherein the card reader connects to the mobile station via audio line-in, Bluetooth™, USB, data port, NFC, IrdA™, Wifi™ or any other wireless or wireline communication path.

11. The electronic payment method as claimed in claim 7, wherein the payment details are data representing a payment transaction.

12. The electronic payment method as claimed in claim 7, wherein the payment details comprise payment sum and currency.

13. A non-transitory electronic payment software program product stored in at least one data storage device, said software program facilitating electronic payments in a system comprising a mobile station, a payment card reader, a communication network and a back-end server, the non-transitory software program product being configured to cause a processor to execute a method comprising:

connecting payment card reader software into a data port of the mobile station, the mobile station comprising a third party software application controlling said payment card reader software;

reading, by said payment card reader software, payment details from a payment card;

one or more of reading and receiving, by said third party software application, the payment details from the payment card reader software and transmitting said payment details to back-end server software via a wireless Internet connection when said connection is available as a first choice, and via a plurality of Short Message Service (SMS) or Unstructured Supplementary Services Data (USSD) messages as a second choice when said wireless Internet connection is unavailable, wherein the payment details are split into a plurality of data payload parts of a data payload, and each said SMS or USSD message comprises one of the data payload parts and a serial identification number, identifying the data payload, said SMS or USSD messages are sent to the back-end server that recombines all of the plurality of data payload parts in all of the plurality of SMS or USSD messages into all of the payment details, and the back-end server sends a confirmatory message back to said mobile third party application upon having received all of the SMS and USSD messages or all of the payment details, and the mobile third party application comprises a time limit T1, within which when the confirmatory message is not received at the mobile third party application, said mobile third party application sends the SMS and USSD messages comprising the payment details again to the back-end server.

14. The non-transitory electronic payment software program product as claimed in claim 13, wherein the back-end server software is configured to check the integrity of the payment details and the plurality of messages, and when a message is missing or has a defect, the back-end server software sends a check-up message back to the mobile third party software application that sent the messages and requests the resending of the missing or defective messages.

15. The non-transitory electronic payment software program product as claimed in claim 13, wherein the payment data is encrypted by the card reader software.

16. The non-transitory electronic payment software program product as claimed in claim 13, wherein the card reader software is arranged to be connected to the mobile station via audio line-in, Bluetooth™, USB, data port, NFC, IrdA™, Wifi™ or any other wireless or wireline communication path.

17. The non-transitory electronic payment software program product as claimed in claim 13, wherein the payment details are data representing a payment transaction.

18. The non-transitory electronic payment software program product as claimed in claim 13, wherein the payment details comprise payment sum and currency.

* * * * *